(12) United States Patent
Mixter (10) Patent No.: US 11,468,330 B2
(45) Date of Patent: Oct. 11, 2022

(54) ARTIFICIAL NEURAL NETWORK GROWTH

(71) Applicant: Raytheon Company, Waltham, MA (US)

(72) Inventor: John E. Mixter, Tucson, AZ (US)

(73) Assignee: Raytheon Company, Waltham, MA (US)

(*) Notice: Subject to any disclaimer, the term of this patent is extended or adjusted under 35 U.S.C. 154(b) by 1105 days.

(21) Appl. No.: 16/054,387

(22) Filed: Aug. 3, 2018

(65) Prior Publication Data

US 2020/0042878 A1    Feb. 6, 2020

(51) Int. Cl.
    *G06N 3/08*        (2006.01)
    *G06N 3/04*        (2006.01)

(52) U.S. Cl.
CPC ............ *G06N 3/082* (2013.01); *G06N 3/049* (2013.01); *G06N 3/0472* (2013.01)

(58) Field of Classification Search
CPC ....... G06N 3/0472; G06N 3/049; G06N 3/082
See application file for complete search history.

(56) References Cited

U.S. PATENT DOCUMENTS

| | | |
|---|---|---|
| 9,424,514 B2 | 8/2016 | Weng |
| 2016/0307096 A1 | 10/2016 | Goel et al. |
| 2018/0046900 A1 | 2/2018 | Dally et al. |
| 2018/0046915 A1 | 2/2018 | Sun et al. |
| 2018/0068216 A1 | 3/2018 | Sheng et al. |
| 2018/0096249 A1 | 4/2018 | Kim et al. |
| 2018/0137406 A1 | 5/2018 | Howard et al. |
| 2018/0137417 A1 | 5/2018 | Theodorakopoulos et al. |
| 2019/0095798 A1* | 3/2019 | Baker ............... G06N 3/063 |

FOREIGN PATENT DOCUMENTS

| | | |
|---|---|---|
| WO | WO-2018022821 A1 | 2/2018 |
| WO | WO-2018058509 A1 | 4/2018 |
| WO | WO-2018084974 A1 | 5/2018 |
| WO | WO-2020028770 A1 | 2/2020 |

OTHER PUBLICATIONS

Wang et al., "Deep Growing Learning", Oct. 2017, 2017 IEEE International Conference on Computer Vision (ICCV), pp. 2831-2839 (Year: 2017).*

(Continued)

*Primary Examiner* — Brent Johnston Hoover (74) *Attorney, Agent, or Firm* — Schwegman Lundberg & Woessner, P.A.

(57) ABSTRACT

A method to grow an artificial neural network is disclosed. A seed neural network is trained on all classes in a dataset. All classes in the dataset are applied to the seed network, and average output values of the seed network are calculated. Class members that are nearest to and furthest from the average output values are selected, the class members are applied to the seed network, and a standard deviation is calculated. Perceptrons are added to the seed network, and inputs of the added perceptrons are connected to the seed layer based on the calculated standard deviation. A classifier is then added to the outputs of the added perceptrons, and the seed network and the added perceptrons are trained using all members in the dataset.

20 Claims, 5 Drawing Sheets

(56) References Cited

OTHER PUBLICATIONS

"International Application Serial No. PCT/US2019/044838, International Preliminary Report on Patentability dated Feb. 18, 2021", 15 pgs.
Han, et al., "DSD: Dense-Sparse-Dense Training for Deep Neural Networks", International Conference on Learning Representations, (2017), 1-13.
Hubara, Itay, et al., "Binarized neural networks", 30th Conference on Neural Information Processing Systems, (2016), 9 pgs.
Parisi, German, et al., "Lifelong learning of human actions with deep neural network self-organization", Neural Networks, vol. 96, (2017), 137-149.
Wen, Wei, et al., "Learning structured sparsity in deep neural networks", arXiv:1608.03665v4 [cs.NE], (2016), 10 pgs.
"International Application Serial No. PCT US2019 044838, International Search Report dated Nov. 5, 2019", 4 pgs.
"International Application Serial No. PCT US2019 044838, Written Opinion dated Nov. 5, 2019", 13 pgs.
Parekh, Rajesh, "Constructive Neural-Network Learning Algorithms for Pattern Classification", IEEE Transactions on Neural Networks, IEEE Service Center, Piscataway, NJ, US, vol. 11, No. 2, (Jan. 1, 2000), 16 pgs.
Sharma, Sudhir Kumar, "Constructive Neural Networks: A Review", International Journal of Engineering Science and Technology, (Jan. 1, 2010), 9 pgs.
Wang, Guangcong, "Deep Growing Learning", 2017 IEEE International Conference on Computer Vision (ICCV), IEEE,, (Oct. 22, 2017), 9 pgs.

\* cited by examiner

ARTIFICIAL NEURAL NETWORK GROWTH

TECHNICAL FIELD

The present disclosure relates to artificial neural networks, and in an embodiment, but not by way of limitation, growing such artificial neural networks.

BACKGROUND

State of the art artificial neural networks are generally over-built. This is proven by the fact that significant pruning of weights and connections in the network can be done without negatively impacting performance.

More specifically, after an artificial neural network has been trained, a significant number of connections within the network can be removed without reducing the accuracy of the network. In fact, reducing the number of connections often results in an increase in accuracy, and always results a reduction of execution time. The largest impact of such reduction occurs in the fully connected layers of such neural networks. In a fully connected layer, every neuron in the layer is connected to every neuron in the previous layer. A fully connected layer with 1,000 neurons would have 400,000 connections to a previous layer of 400 neurons. Because the outputs of neurons are a result of the sum of the neuron weights times their inputs, weights that are near zero have little or no impact on the sum. These weights and their connections can be eliminated without negatively impacting accuracy.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

To address the issue of the over-building of artificial neural networks, an embodiment of the present disclosure grows an artificial neural network from a seed network. In this manner, smaller and more accurate artificial neural networks can be built. This growth is accomplished by analyzing the training data to determine what connections should be established in the fully connected layer of an artificial neural network. This results in a significantly smaller network that uses less power and executes faster than traditionally built artificial neural networks. These smaller artificial neural networks, unlike traditionally built artificial neural networks, can be placed into unmanned air vehicles, missiles, and other platforms wherein space and memory are at a premium.

This creation of smaller artificial neural networks benefits any device that is considering artificial neural networks but is discouraged by the current processing power requirements of artificial neural networks. In an embodiment of this disclosure, artificial neural network connections are made between layers based on the activity of the neurons in the previous layer. This allows only connections that have value to be connected. The fewer connections that are made, the less memory and computational power are needed to employ the artificial neural network.

As noted above, in a typical artificial neural network, many neuron connections can be eliminated without affecting the accuracy of the network. The neuron connections that can be eliminated without negatively affecting the network are the connections with weights that are close to zero. However, instead of building an artificial neural network and then determining which neuron connections can be trimmed or paired back, an embodiment addresses this over-building of artificial neural networks by initially controlling the growth of the artificial neural network. Specifically, instead of fully connecting a layer to the previous layer, the output activity of the previous layer is used to determine which connections should be made. In an embodiment, neurons with activity levels one standard deviation above and below the average output of the neurons in a new layer are ideal for connection to the previous layer.

The number of neurons in the fully connected layer is calculated based on the number of classes in a dataset. For each class, two samples are chosen based on their difference from the average sample of that class. The samples most and least like the average are chosen to create the best connections in the fully connected layer. For each class, two neurons are added that represent the two samples. To calculate the average, most and least samples, all the training data are applied to the seed layer. In an embodiment, the seed layer is a two-layer convolutional neural network. As each class of the training data is applied, the output of the seed convolutional neural network is analyzed to find the average, least, and most samples for each class. After the sample data are found, two neurons for each class are connected to the seed convolutional neural network. The neurons in the output layer of the seed layer convolutional neural network that have outputs that are plus and minus one standard deviation from the average are connected to the newly added neuron pairs. This is done for each class in the training data. After the sparse layer is grown based on the input data, a classifier is added to that layer and the entire network is trained.

Figure 1A:
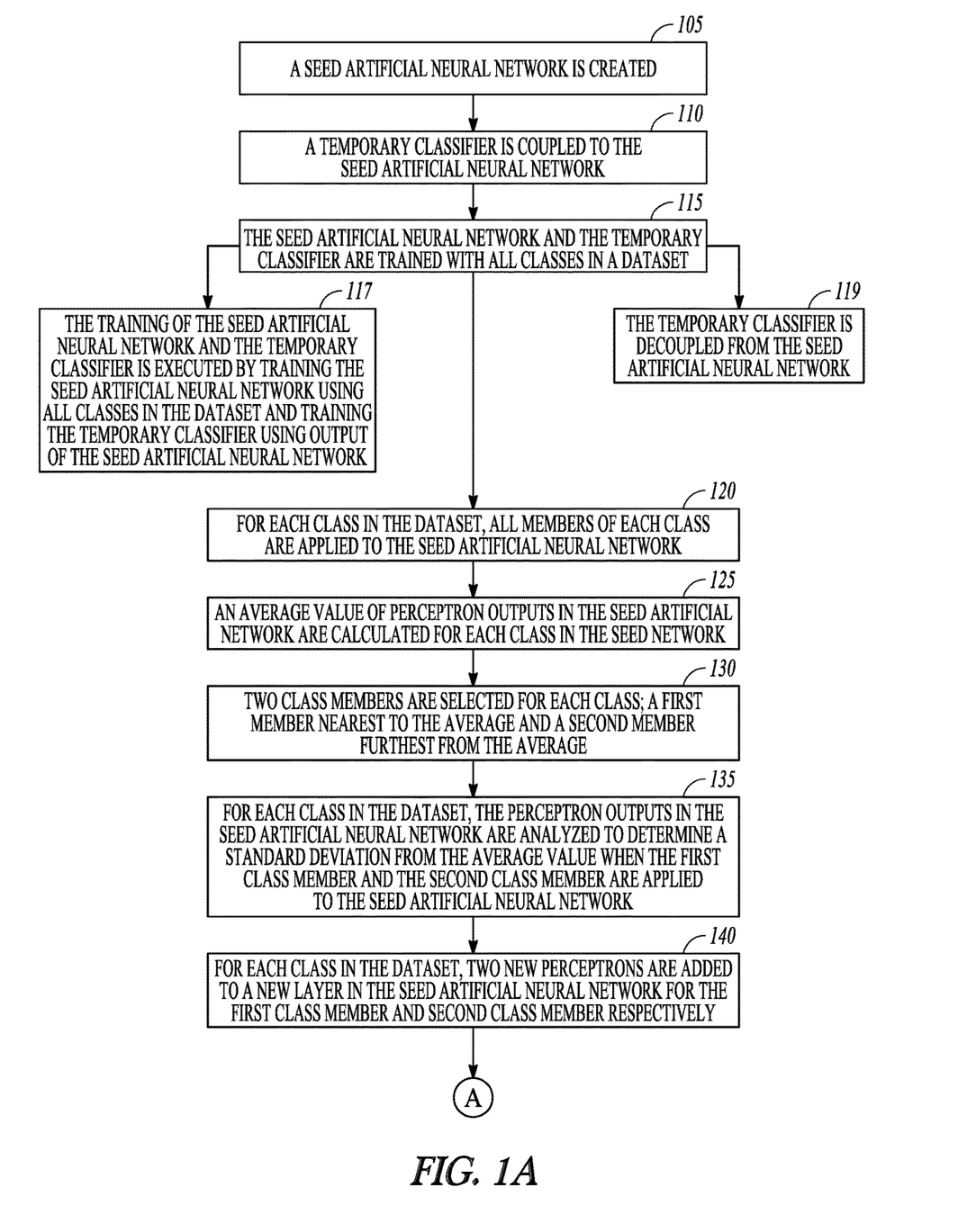
FIGS. 1A and 1B are a block diagram of operations and features of building and growing an artificial neural network.
Figure 1B:
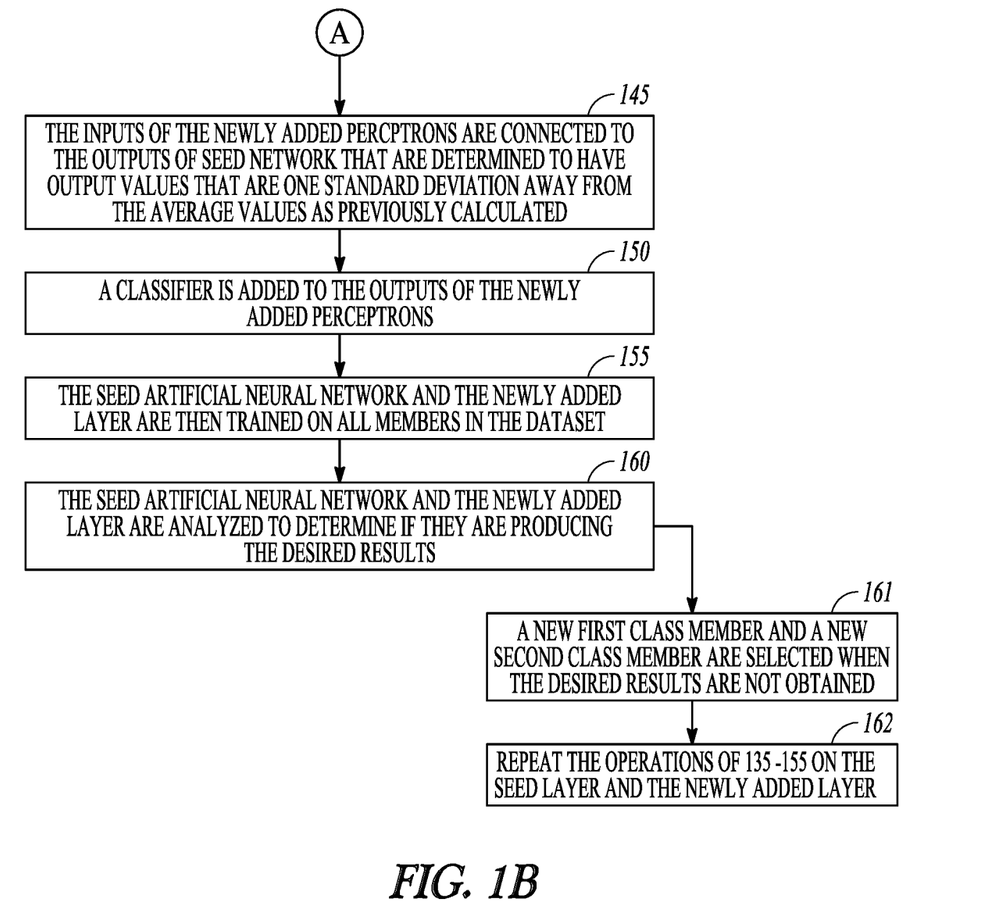

FIGS. 1A and 1B are a block diagram illustrating operations and features of an example system and method for growing artificial neural networks. FIGS. 1A and 1B include a number of process blocks 105-162. Though arranged substantially serially in the example of FIGS. 1A and 1B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Figure 2:
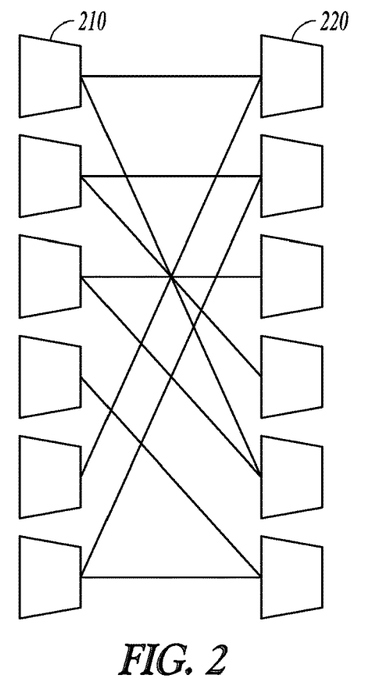
FIG. 2 is a block diagram of a seed artificial neural network.

Referring now specifically to FIGS. 1A and 1B, at 105, a seed artificial neural network is created. A block diagram of an example seed artificial neural network is illustrated in FIG. 2. The example neural network of FIG. 2 is a two-level convolutional artificial neural network, with a first layer including neurons 210 and a second layer including neurons 220. An advantage of using a convolutional artificial neural network as the seed network is that convolutional neural networks share weights, and this sharing keeps the size of the growing network small, which is a goal of this disclosure.

Figure 2A:
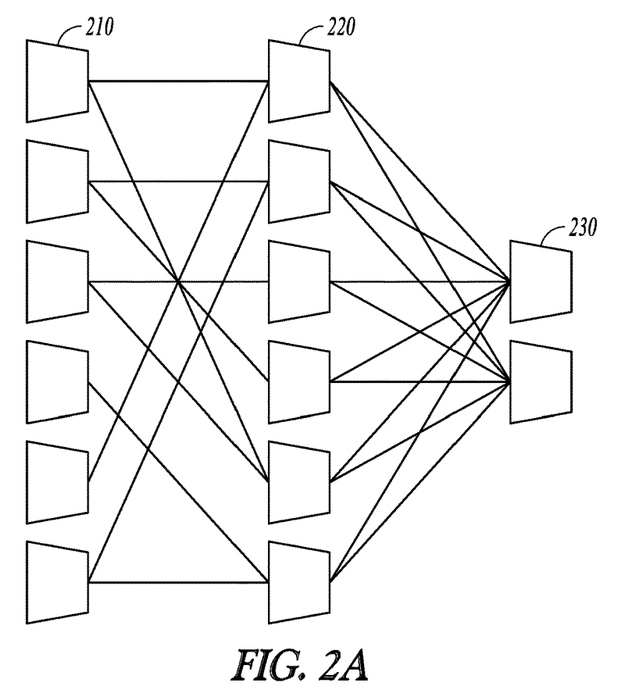
FIG. 2A is a block diagram of a seed artificial neural network with a temporary classifier coupled to it.

At 110, a temporary classifier is coupled to the seed artificial neural network, and at 115, the seed artificial neural network and the temporary classifier are trained with all classes in a dataset. As indicated at 117, the training of the seed artificial neural network and the temporary classifier is executed by training the seed artificial neural network using all classes in the dataset and training the temporary classifier using output of the seed artificial neural network. After the training, at 119, the temporary classifier is decoupled from the seed artificial neural network. FIG. 2A is a block diagram illustrating a seed artificial neural network 210, 220 with a temporary classifier 230 coupled to it. The training of the seed artificial neural network and the temporary classifier with all classes in the dataset generates convolutional layer weights with values that produce meaningful outputs.

The following operations, 120-150, are separately executed for each class in the dataset. Specifically, at 120, for each class in the dataset, all members of each class are applied to the seed artificial neural network. Then, at 125, an average value of perceptron outputs in the seed artificial network are calculated for each class in the seed network. At 130, two class members are selected for each class. A first class member is selected that generates a first perceptron (or neuron) output that is nearest to the calculated average value for that class. A second class member is selected that generates a second perceptron (or neuron) output that is furthest from the average value for that class. Then, at 135, and once again, for each class in the dataset, the perceptron outputs in the seed artificial neural network are analyzed to determine a standard deviation (or other statistical variance measure) from the average value when the first class member and the second class member are applied to the seed artificial neural network.

Figure 2B:
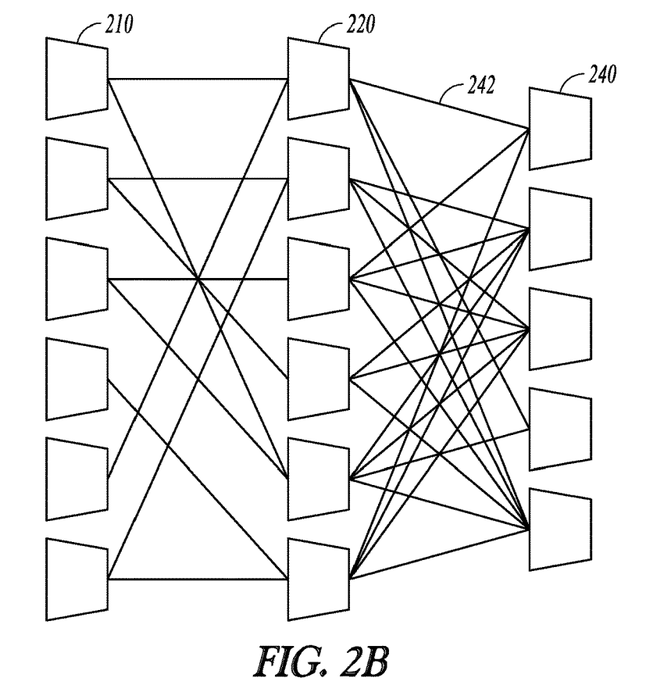
FIG. 2B is a block diagram of a seed artificial neural network with a new layer of neurons attached to it.
Figure 2C:
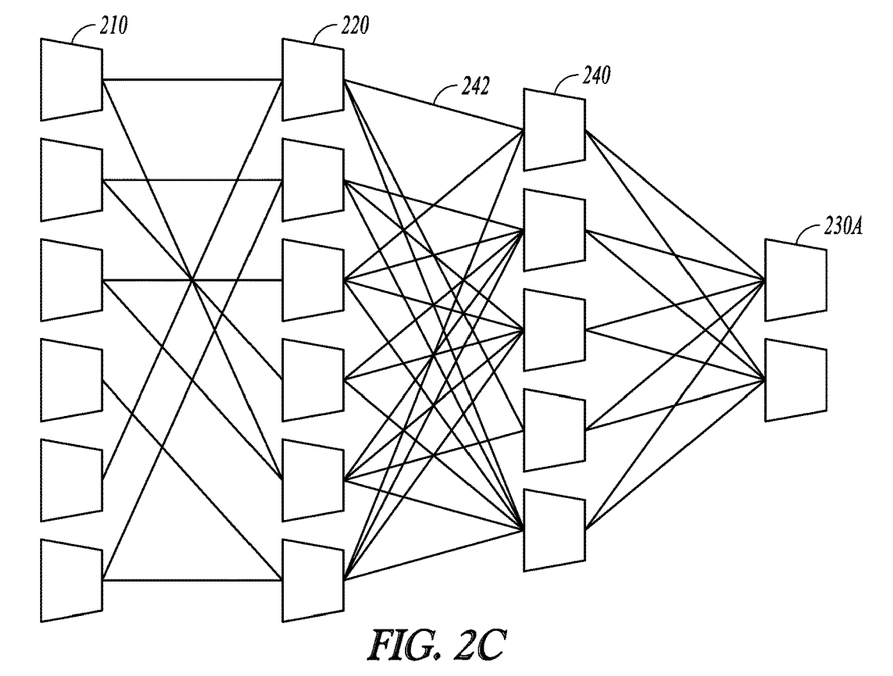
FIG. 2C is a block diagram of the seed artificial neural network and new neuron layer of FIG. 2B with a temporary classifier attached to it.

At 140, for each class in the dataset, two new perceptrons are added to a new layer in the seed artificial neural network. One of the added perceptrons is associated with the first class member and one of the added perceptrons is associated with the second class member. FIG. 2B illustrates the new perceptrons 240 that have been added to the seed artificial neural network. FIG. 2B further illustrates the connections 242 that are made between the perceptrons 220 of the seed network and the new perceptrons 240. More specifically, as indicated at 145, the inputs of the newly added perceptrons 240 are connected to the outputs of the seed network that are determined to have output values that are one standard deviation away from the average values as previously calculated. After the new perceptrons 240 are added to the seed network, at 150, and as illustrated in FIG. 2C, a classifier 230A is added to the outputs of the newly added perceptrons 240. Then at 155, the combined seed artificial neural network and the newly added layers are trained on all members in the dataset.

At 160, the combined seed artificial neural network and the newly added layers are analyzed to determine if they are producing the desired results. This is accomplished by presenting the testing dataset to the neural network. If the accuracy of the neural network does not meet the goal accuracy, then at 161, a new first class member and a new second class member are selected. The new first class member is selected such that it is the next nearest to the calculated average, and the new second class member is selected such that it is the next furthest from the calculated average. Then, at 162, the above-discussed operations are repeated. That is, the perceptron outputs are analyzed to determine a standard deviation from the average value for the new first class member and the new second class member, two perceptrons are added to a new layer in the seed artificial neural network, inputs of the two added perceptrons are connected to the perceptron outputs in the seed artificial neural network that are determined to have output values that are one standard deviation from the average value, a classifier is added to perceptron outputs of the two added perceptrons, and the seed artificial neural network and the new layer are trained on all members in the dataset.

Figure 3:
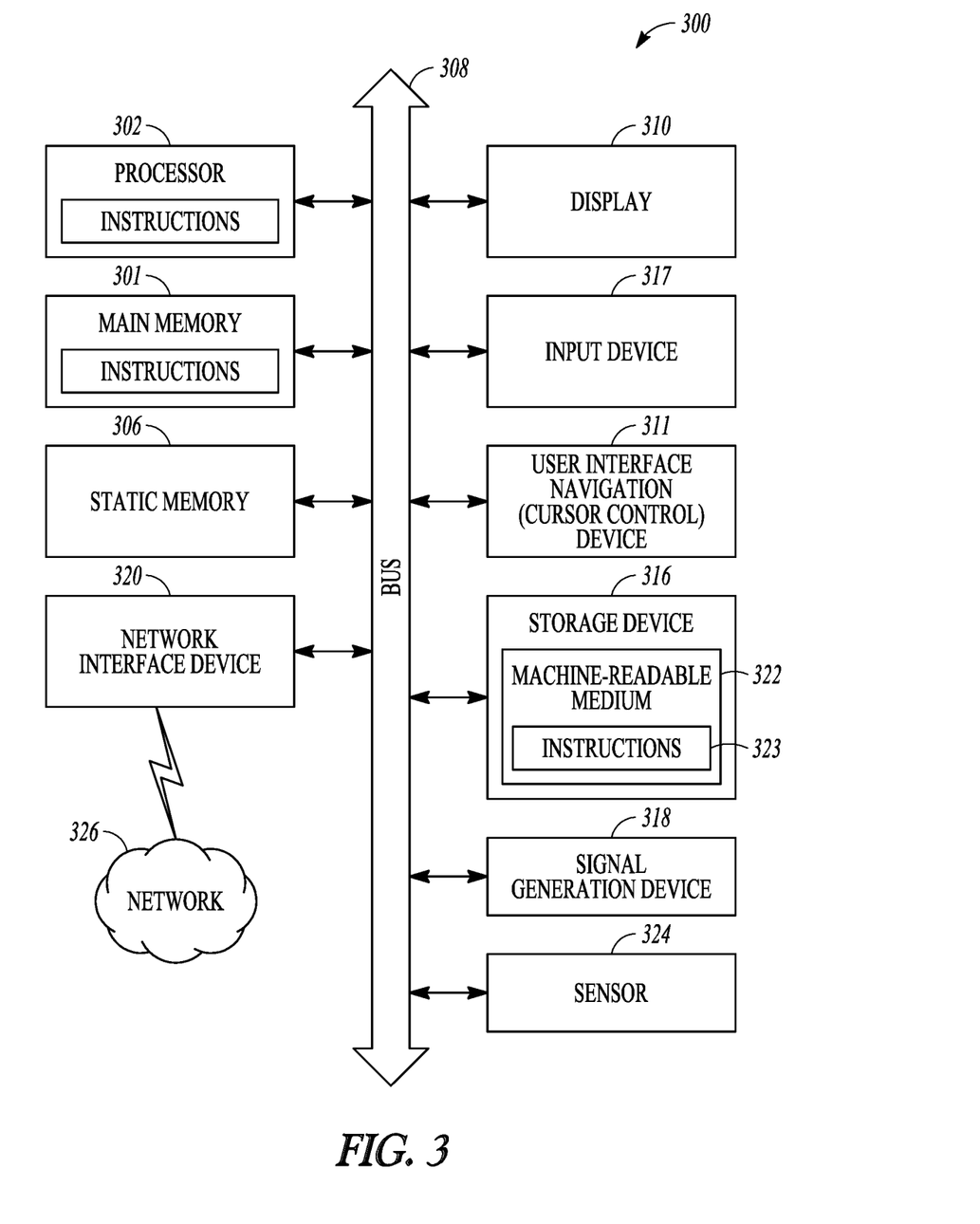
FIG. 3 is a block diagram of a computer system upon which one or more embodiments of the present disclosure can execute.

FIG. 3 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 301 and a static memory 306, which communicate with each other via a bus 308. The computer system 300 may further include a display unit 310, an alphanumeric input device 317 (e.g., a keyboard), and a user interface (UI) navigation device 311 (e.g., a mouse). In one embodiment, the display, input device and cursor control device are a touch screen display. The computer system 300 may additionally include a storage device 316 (e.g., drive unit), a signal generation device 318 (e.g., a speaker), a network interface device 320, and one or more sensors 321, such as a global positioning system sensor, compass, accelerometer, or other sensor.

The drive unit 316 includes a machine-readable medium 322 on which is stored one or more sets of instructions and data structures (e.g., software 323) embodying or utilized by any one or more of the methodologies or functions described herein. The software 323 may also reside, completely or at least partially, within the main memory 301 and/or within the processor 302 during execution thereof by the computer system 300, the main memory 301 and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 323 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
(a) creating a seed artificial neural network;
(b) coupling a temporary classifier to the seed artificial neural network;
(c) training the seed artificial neural network and the temporary classifier using all classes in a dataset;
(d) for each class in the dataset, applying all members of each class to the seed artificial neural network;
(e) for each class in the dataset, calculating an average value of perceptron outputs in the seed artificial neural network;
(f) for each class in the dataset, selecting a first class member that generates a first perceptron output that is a least distance from the average value and selecting a second class member that generates a second perceptron output that is a greatest distance from the average value;
(g) for each class in the dataset, analyzing the perceptron outputs in the seed artificial neural network to determine a measure of variance from the average value when the first class member and the second class member are applied to the seed artificial neural network;
(h) for each class in the dataset, adding a first perceptron associated with the first class member and a second perceptron associated with the second class member to a new layer in the seed artificial neural network;
(i) for each class in the dataset, connecting inputs of the first perceptron and inputs of the second perceptron to the perceptron outputs in the seed artificial neural network that are determined to have output values that are a threshold variance from the average value;
(j) adding a classifier to perceptron outputs of the first perceptron and outputs of the second perceptron; and
(k) training the seed artificial neural network and the new layer on all members in the dataset.

2. The process of claim 1, wherein the seed artificial neural network comprises a two-layer convolutional neural network.

3. The process of claim 1, comprising decoupling the temporary classifier from the seed artificial neural network after the seed artificial neural network and the temporary classifier have been trained.

4. The process of claim 1, wherein the training of the seed artificial neural network and the temporary classifier comprises training the seed artificial neural network using all classes in the dataset and training the temporary classifier using output of the seed artificial neural network.

5. The process of claim 1, comprising:
analyzing output of the seed artificial neural network and the new layer;
selecting a next least distant first class member and a next greatest distant second class member; and
repeating operations (g)-(k) using the next least distant first class member and the next greatest distant second class member.

6. The process of claim 1, wherein the variance measure comprises a standard deviation and wherein the threshold variance comprises one standard deviation.

7. The process of claim 1, wherein the average value comprises a mean, a median, or a mode.

8. A non-transitory computer readable medium comprising instructions that when executed by a processor execute a process comprising:
(a) creating a seed artificial neural network;
(b) coupling a temporary classifier to the seed artificial neural network;
(c) training the seed artificial neural network and the temporary classifier using all classes in a dataset;
(d) for each class in the dataset, applying all members of each class to the seed artificial neural network;
(e) for each class in the dataset, calculating an average value of perceptron outputs in the seed artificial neural network;

(f) for each class in the dataset, selecting a first class member that generates a first perceptron output that is a least distance from the average value and selecting a second class member that generates a second perceptron output that is a greatest distance from the average value;

(g) for each class in the dataset, analyzing the perceptron outputs in the seed artificial neural network to determine a measure of variance from the average value when the first class member and the second class member are applied to the seed artificial neural network;

(h) for each class in the dataset, adding a first perceptron associated with the first class member and a second perceptron associated with the second class member to a new layer in the seed artificial neural network;

(i) for each class in the dataset, connecting inputs of the first perceptron and inputs of the second perceptron to the perceptron outputs in the seed artificial neural network that are determined to have output values that are a threshold variance from the average value;

(j) adding a classifier to perceptron outputs of the first perceptron and outputs of the second perceptron; and (k) training the seed artificial neural network and the new layer on all members in the dataset.

9. The non-transitory computer readable medium of claim 8, wherein the seed artificial neural network comprises a two-layer convolutional neural network.

10. The non-transitory computer readable medium of claim 8, comprising instructions for decoupling the temporary classifier from the seed artificial neural network after the seed artificial neural network and the temporary classifier have been trained.

11. The non-transitory computer readable medium of claim 8, wherein the training of the seed artificial neural network and the temporary classifier comprises training the seed artificial neural network using all classes in the dataset and training the temporary classifier using output of the seed artificial neural network.

12. The non-transitory computer readable medium of claim 8, comprising instructions for:
analyzing output of the seed artificial neural network and the new layer;
selecting a next least distant first class member and a next greatest distant second class member; and
repeating operations (g)-(k) using the next least distant first class member and the next greatest distant second class member.

13. The non-transitory computer readable medium of claim 8, wherein the variance measure comprises a standard deviation and wherein the threshold variance comprises one standard deviation.

14. The non-transitory computer readable medium of claim 8, wherein the average value comprises a mean, a median, or a mode.

15. A system comprising:
a computer processor:
and a memory coupled to the computer processor;
wherein the computer processor and the memory are operable for:
(a) creating a seed artificial neural network;
(b) coupling a temporary classifier to the seed artificial neural network;

(c) training the seed artificial neural network and the temporary classifier using all classes in a dataset;

(d) for each class in the dataset, applying all members of each class to the seed artificial neural network;

(e) for each class in the dataset, calculating an average value of perceptron outputs in the seed artificial neural network;

(f) for each class in the dataset, selecting a first class member that generates a first perceptron output that is a least distance from the average value and selecting a second class member that generates a second perceptron output that is a greatest distance from the average value;

(g) for each class in the dataset, analyzing the perceptron outputs in the seed artificial neural network to determine a variance measure from the average value when the first class member and the second class member are applied to the seed artificial neural network;

(h) for each class in the dataset, adding a first perceptron associated with the first class member and a second perceptron associated with the second class member to a new layer in the seed artificial neural network;

(i) for each class in the dataset, connecting inputs of the first perceptron and inputs of the second perceptron to the perceptron outputs in the seed artificial neural network that are determined to have output values that are a threshold variance from the average value;

(j) adding a classifier to perceptron outputs of the first perceptron and outputs of the second perceptron; and (k) training the seed artificial neural network and the new layer on all members in the dataset.

16. The system of claim 15, wherein the seed artificial neural network comprises a two-layer convolutional neural network.

17. The system of claim 15, wherein the computer processor is operable for decoupling the temporary classifier from the seed artificial neural network after the seed artificial neural network and the temporary classifier have been trained.

18. The system of claim 15, wherein the training of the seed artificial neural network and the temporary classifier comprises training the seed artificial neural network using all classes in the dataset and training the temporary classifier using output of the seed artificial neural network.

19. The system of claim 15, wherein the computer processor is operable for:
analyzing output of the seed artificial neural network and the new layer;
selecting a next least distant first class member and a next greatest distant second class member; and
repeating operations (g)-(k) using the next least distant first class member and the next greatest distant second class member.

20. The system of claim 15, wherein the variance measure comprises a standard deviation; wherein the threshold variance comprises one standard deviation; and wherein the average value comprises a mean, a median, or a mode.

* * * * *